(12) United States Patent
Poskie et al.

(10) Patent No.: US 7,837,590 B2
(45) Date of Patent: Nov. 23, 2010

(54) TRANSMISSION ASSEMBLY

(75) Inventors: Fredrick R. Poskie, Plymouth, MI (US); Elizabeth I. Wooden, Farmington Hills, MI (US); Scott H. Wittkopp, Ypsilanti, MI (US); James W. Haynes, Saline, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 620 days.

(21) Appl. No.: 11/684,682

(22) Filed: Mar. 12, 2007

(65) Prior Publication Data

US 2008/0227584 A1    Sep. 18, 2008

(51) Int. Cl.
    *F16H 3/44*    (2006.01)
(52) U.S. Cl. .................... 475/317; 475/311; 475/323
(58) Field of Classification Search ............ 475/311, 475/317, 323
    See application file for complete search history.

(56) References Cited

U.S. PATENT DOCUMENTS

| | | | | |
|---|---|---|---|---|
| 2,510,469 A | * | 6/1950 | Greenlee | 475/315 |
| 2,870,655 A | * | 1/1959 | Rockwell | 475/142 |
| 3,069,929 A | * | 12/1962 | Hansen | 475/322 |
| 3,295,394 A | * | 1/1967 | Whateley | 475/142 |
| 4,688,664 A | * | 8/1987 | Miller | 192/18 A |
| 4,724,720 A | * | 2/1988 | Ohkubo | 475/41 |
| 5,538,481 A | * | 7/1996 | Friedmann | 475/142 |
| 6,039,160 A | | 3/2000 | Joppeck | |
| 6,458,056 B1 | * | 10/2002 | Brown et al. | 475/204 |
| 6,830,141 B1 | | 12/2004 | Neelakantan et al. | |
| 6,878,086 B2 | * | 4/2005 | Sugiura et al. | 475/279 |
| 7,070,532 B2 | | 7/2006 | Stevenson et al. | |

\* cited by examiner

*Primary Examiner*—Ha D. Ho

(57) ABSTRACT

A transmission assembly includes a clutch housing, a gear arrangement disposed within the clutch housing, and a fixed component. A brake having a housing and a hub is also included. The housing is coupled to the fixed component and the hub is coupled to the gear arrangement. The brake is disposed external to the clutch housing and cooperates with the gear arrangement to provide at least one forward or reverse gear ratio.

8 Claims, 1 Drawing Sheet

_US 7,837,590 B2_

TRANSMISSION ASSEMBLY

FIELD

Figure 1:
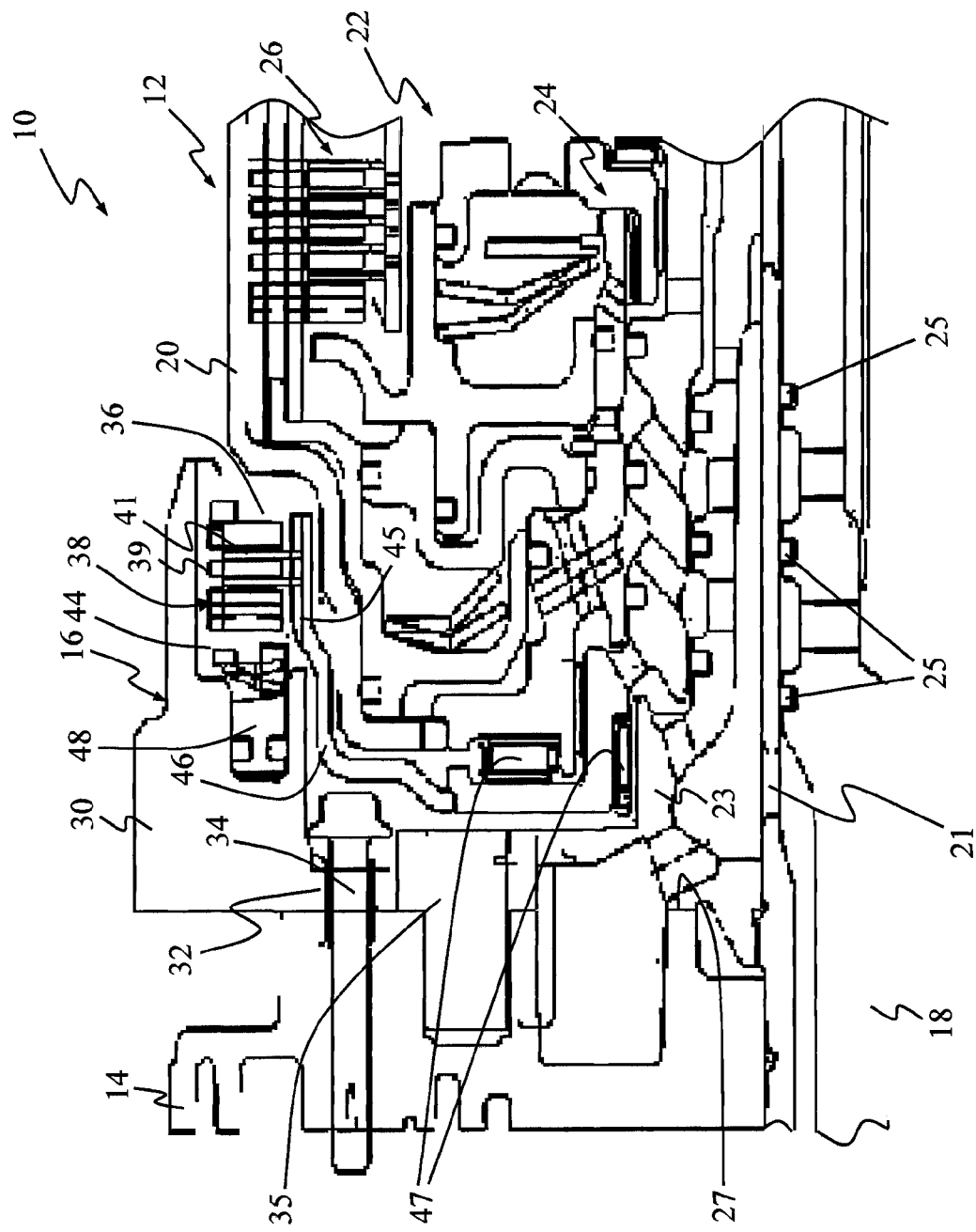

The present disclosure relates to transmissions, and more particularly to a transmission assembly having a torque transmitting device.

BACKGROUND

The statements in this section merely provide background information related to the present disclosure and may not constitute prior art.

Transmission assemblies generally include a plurality of torque transmitting devices coupled to a plurality of gear sets. These torque transmitting devices cooperate with the gear sets to provide a plurality of forward and reverse gear ratios. By actuating specific combinations of torque transmitting devices, specific gear ratios may be selected.

It is known in the art that it is possible to increase the number of gear ratios to an existing gear assembly by adding a torque transmitting device. However, torque transmitting devices can be difficult to add to an existing transmission without modifying the case and surrounding structure of the transmission. This type of modification can increase assembly times, require structural redesigns, and not be cost effective.

Accordingly, there is a need in the art for a transmission assembly arrangement that provides additional gear ratios without requiring that the clutch housing be enlarged or redesigned.

SUMMARY

The present invention provides a transmission assembly.

In one aspect of the present invention the transmission assembly includes a clutch housing, a gear arrangement disposed within the clutch housing, and a fixed component coupled to the clutch housing. A brake having a housing and a hub is also included. The housing is coupled to the fixed component and the hub is coupled to the gear arrangement. The brake is disposed external to the clutch housing and cooperates with the gear arrangement to provide at least one forward or reverse gear ratio.

In another aspect of the present invention the brake is disposed between the fixed component and the clutch housing.

In still another aspect of the present invention the brake is at least partially disposed outboard of the clutch housing.

In another aspect of the present invention the hub is at least partially disposed between the housing of the brake and the clutch housing.

In another aspect of the present invention the fixed component is coupled to an oil pump.

In another aspect of the present invention the housing of the brake includes a radially extending flange, and the housing is coupled to the fixed component at the radially extending flange.

In another aspect of the present invention the housing is coupled to the fixed component by an at least one bolt extending through the radially extending flange.

In another aspect of the present invention the hub is supported by a plurality of bearings.

Further areas of applicability will become apparent from the description provided herein. It should be understood that the description and specific examples are intended for purposes of illustration only and are not intended to limit the scope of the present disclosure.

DRAWINGS

The drawing described herein is for illustration purposes only and are not intended to limit the scope of the present disclosure in any way.

FIG. 1 is a schematic cross sectional view of a transmission assembly according to the principles of the present invention.

DETAILED DESCRIPTION

The following description is merely exemplary in nature and is not intended to limit the present disclosure, application, or uses.

FIG. 1 illustrates a transmission assembly 10 designed according to the principles of the present invention. The transmission assembly 10 is illustrated as a rear-wheel drive transmission, though various other types of transmission may be employed. The transmission assembly 10 generally includes a gear assembly 12, a fixed component 14, an external brake 16, and an input shaft 18. The input shaft 18 is driven by an engine (not shown). Additional components commonly found in transmission assemblies, such as a torque converter or an output shaft, may be included without departing from the scope of the present invention.

The gear assembly 12 includes a clutch housing 20 disposed around and enclosing a gear arrangement 22. The clutch housing 20 protects the mechanical components of the gear arrangement 22 from debris or interference by foreign objects.

The gear arrangement 22 includes a plurality of gears sets 24 (only one of which is shown) coupled with a plurality of torque transmitting devices 26 (only one of which is shown). In the preferred embodiment, the gear sets 24 are planetary gear sets, though various other gear arrangements may be used with the present invention. The torque transmitting devices 26 may be either rotating clutches or brakes. The clutch housing 20 rotatably connects the torque transmitting device 26 with the gear set 24. The gear sets 24 and torque transmitting devices 26 are in turn coupled to the input shaft 18 either directly or through other torque transmitting devices (not shown). The input shaft 18 is sealed to a sleeve shaft 21 by a plurality of seals 25 between the clutch housing 20 sleeve shaft 21 and the input shaft 18. The gear sets 24 and torque transmitting devices 26 cooperate to establish a plurality of forward and reverse gear ratios for the transmission assembly 10.

The fixed component 14 is generally annular in shape and is disposed axially adjacent to the gear assembly 12. The fixed component 14 is coupled to a support member 23 at a first end 27. In this way, the fixed component 14 is restricted from rotation relative to the input shaft 18. In the example provided, the fixed component 14 is an oil pump, but it should be appreciated that the fixed component 14 may be various other devices, such as, for example, a torque converter assembly.

The external brake 16 is generally disposed between the fixed component 14 and the gear assembly 12. The external brake 16 includes a brake housing 30. The brake housing 30 is generally annular in shape. The brake housing 30 includes a flange 32 that extends radially inward towards the input shaft 18. The external brake 16 is coupled to the fixed component 14 by a plurality of bolts 34 (only one of which is shown) that extend through the flange 32 of the brake housing 30. Additionally, a dowel 35 also extends through the flange 32 of the brake housing 30 and couples the external brake 16 to the fixed component 14. In this way, the brake housing 30 is fixed relative to the input shaft 18 and gear arrangement 22 of the gear assembly 12.

The external brake 16 further includes a cavity 36 formed within the brake housing 30. A plurality of reaction discs 38 are disposed within the cavity 36. The reaction discs 38 include a plurality of steel discs 39 and fiber faced discs 41. The steel discs 39 are coupled at an outer radial surface to a spline 44 formed in the brake housing 30 within the cavity 36. The fiber faced discs 41 are coupled at an inner radial surface to a spline 45 formed on a hub 46. The steel discs 39 and fiber faced discs 41 are moveable in an axial direction along the splines 44 and 45.

The hub 46 extends out from the cavity 36, away from the brake housing 30 of the external brake 16, and is coupled to the gear arrangement 22 of the gear assembly 12. The hub 46 is disposed between the brake housing 30 and the clutch housing 20 of the gear assembly 12. The hub 46 is supported for rotational movement within the gear assembly 12 by a plurality of bearings 47.

The external brake 16 further includes an actuator 48. The actuator 48 may take several forms, for example, the actuator 48 may include a fluid operated piston and return spring. The actuator 48 is coupled to the brake housing 30 and the reaction discs 38. The actuator 48 is operable to move the reaction discs 38 in the axial direction from an engaged position to a disengaged position. In the engaged position, torque is transmitted from the input shaft 18, through the gear arrangement 22, through the hub 46, and through the engaged reaction discs 38 to the brake housing 30. Since the brake housing 30 is fixed to the fixed component 14, the external brake 16 acts as a braking element for the gear assembly 12. For example, the external brake 16 may act to restrict rotation of a member of the plurality of gear sets 24, such as a sun gear, when the reaction discs 38 are in the engaged position. When the reaction discs 38 are in the disengaged position, torque is not transmitted therethrough and the hub 46 is allowed to freely rotate without restriction.

As can be seen, the external brake 16 is disposed external to the clutch housing 20 of the gear assembly 12. The outboard radius of the external brake 16 is only slightly larger than the outboard radius of the clutch housing 20 in order to limit the radial size of the transmission assembly 10. By coupling the external brake 16 to the fixed component 14, the clutch housing 20 need not be enlarged to accommodate the external brake 16. At the same time, the external brake 16 provides additional forward and reverse gear ratios by cooperating with the gear arrangement 22.

The description of the invention is merely exemplary in nature and variations that do not depart from the gist of the invention are intended to be within the scope of the invention. Such variations are not to be regarded as a departure from the spirit and scope of the invention.

What is claimed is:

1. A transmission assembly comprising:
   a rotating clutch housing for housing a clutch;
   a gear arrangement disposed within the clutch housing;
   a fixed component disposed axially forward of the gear arrangement; and
   a brake having a housing and a hub, the housing having a radially inwardly extending flange, wherein the housing is coupled to the fixed component at the radially inwardly extending flange and the hub is coupled to the gear arrangement, wherein the brake is disposed external to the clutch housing and cooperates with the gear arrangement to provide at least one forward or reverse gear ratio.

2. The assembly of claim 1 wherein the brake is disposed axially between the fixed component and the clutch housing.

3. The assembly of claim 2 wherein the brake is at least partially disposed radially outboard of the clutch housing.

4. The assembly of claim 3 wherein the hub is at least partially disposed between the housing of the brake and the clutch housing.

5. The assembly of claim 1 wherein the fixed component is an oil pump or a torque converter.

6. The assembly of claim 1 wherein the housing is coupled to the fixed component by at least one bolt extending through the radially inwardly extending flange.

7. The assembly of claim 1 wherein the housing is coupled to the fixed component by at least one dowel extending through the radially inwardly extending flange into the fixed component.

8. The assembly of claim 1 wherein the radially inwardly extending flange is disposed axially between the fixed component and the rotating clutch housing.

\* \* \* \* \*